UNITED STATES PATENT OFFICE.

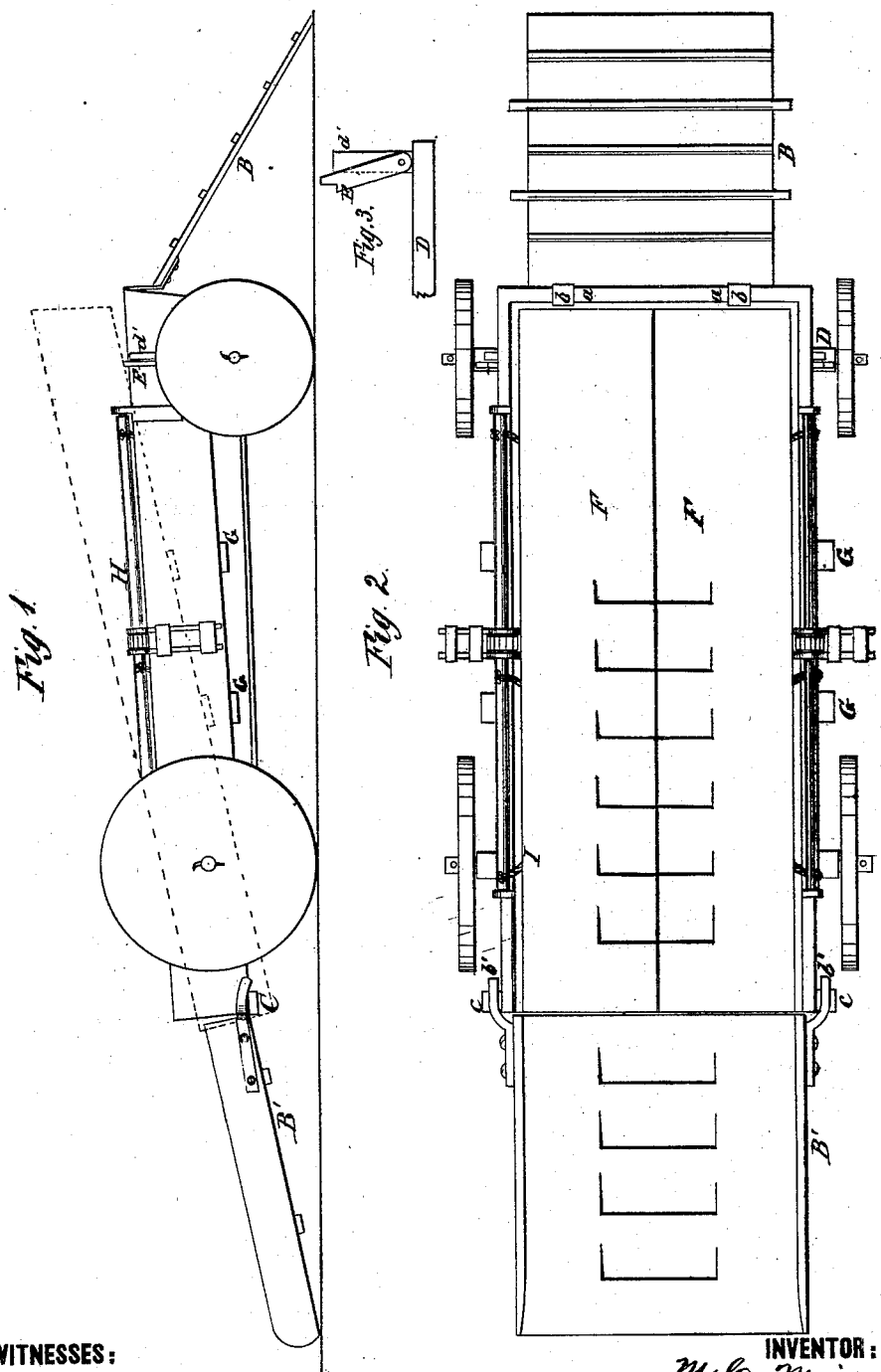

MONTGOMERY C. MEIGS AND HENRY L. MEIGS, OF ROMNEY, INDIANA.

IMPROVEMENT IN DUMPING-WAGONS.

Specification forming part of Letters Patent No. 166,125, dated July 27, 1875; application filed June 7, 1875.

*To all whom it may concern:*

Be it known that we, MONTGOMERY C. MEIGS and HENRY L. MEIGS, of Romney, in the county of Tippecanoe and State of Indiana, have invented a new and Improved Contrivance for Loading and Unloading Wagons; and we do hereby declare that the following is a full, clear, and exact description of the same, reference being had to the accompanying drawing, forming a part of this specification, in which—

Figure 1 is a longitudinal vertical section; Fig. 2, a plan view. Fig. 3 of drawing is a detail view in front elevation.

The invention relates to that class of wagons employed in receiving and discharging dirt and gravel while grading roads, making excavations and embankments, or at other times. It will first be fully described, and then pointed out in the claim.

A represents a wagon placed on low axles, and provided at the ends with movable skids B B', the one B being attached by hooks $b\ b$ in notches $a\ a$ of wagon head-board, while the tail-skid B' has curved or hooked projections $b'\ b'$ that rest upon the ends $c\ c$ of the cross-bar C.

With our scraper, for which we received a Patent No. 122,627, January 9, 1872, we have made a good many ditches and graded a good deal of road, but we find a need for some means of transporting earth and other materials over longer distances than we are able to do with the scraper, and hence we have contrived the present mode of loading wagons with low-hung bodies, the scraper being moved by horse or mule power. It will be perceived that to the tail of the wagon we attach a skid or inclined plane, up which the mule or horse draws the loaded scraper onto the bed or body of the wagon, from which bed or body he descends by a similar inclined plane at the forward end of the wagon, the loaded scraper having been dumped in the forward end of the wagon-body. The mule or horse is guided by a boy riding on his back, who goes round to the plowed earth at the hind end of the wagon, when a man fills the scraper, which is again drawn up the skid into the wagon-body and the load deposited just behind the first one, and so on until there is sufficient earth, and then the skids are removed and the wagon driven off, giving place to a second one, which may be loaded in like manner.

D is the front bolster, having standards $d'\ d'$, to each of which we pivot a bar, E, having an angle-notch, $e$, at the top. The body, being hinged to turn on the rear-axle, is raised, and these bars placed thereunder, so as to receive a corner of each side and hold the body at such a height (after unloading) that the wagon may be turned around short. The tongue of the wagon is attached to front axle, so as to permit it to turn to the right or left, or be detached entirely, the horses or team being thus placed out of the way of the horses and shovels or scrapers as they move in and out of the wagon while loading it; or the tongue may be simply detachable.

To facilitate the unloading as well as the loading, we make the bottom of wagon in two or four unfastened sections, F F, each ordinarily resting upon cross-bars G and connected with a drum or side-roll, H, by ropes, cords, or chains I. By rotating the roller above either section of the bottom, the chains are wrapped on the roller and the section of the bottom raised, so as to make an opening in the middle of the wagon, through which the earth, or other material composing the load, is dropped or dumped. The rollers may be moved by levers with a pawl-and-ratchet attachment, or in any other way. Using this dumping-bed two men can unload one and a quarter to one and a half yards of earth in one half minute. Using two scrapers, two mules, (ridden each by a boy,) and one man, we have loaded into the wagon one and a quarter to one and a half yards in four minutes. A full and effective gang for rapid work would be a sufficient number of wagons to give steady work to four scrapers. With this force, we doubt not that we could load each wagon in two minutes, and the time occupied in delivering the load would depend on the distance to which it would need to be hauled. This dumping-bottom can be applied to any wagon used for the transportation of earth or any similarly disintegrated material, but it is designed especially for use in connection with the loading by scrapers, and in making excavations and embankments.

It is also applicable to such railroad-cars as are used for ballasting the road.

Having thus described our invention, what we claim as new is—

1. The combination, with a wagon-body, of a skid placed at each end, as and for the purpose described.

2. The bars E E, angle-notched at top, and pivoted to the front bolster, as and for the purpose set forth.

3. The combination of bottom sections F F', flexible connections I, and rolls H H, arranged as and for the purpose specified.

MONTGOMERY C. MEIGS.
    HENRY L. MEIGS.

Witnesses:
 JAMES B. FALLEY,
 H. LEANING.